(12) United States Patent
Brueckner

(10) Patent No.: US 11,891,806 B2
(45) Date of Patent: Feb. 6, 2024

(54) BUILDING PRODUCTS WITH GRAPHENE OR GRAPHENE OXIDE

(71) Applicant: Knauf Gips KG, Iphofen (DE)

(72) Inventor: Sylvia Brueckner, Wuerzburg (DE)

(73) Assignee: Knauf Gips KG, Iphofen (DE)

( * ) Notice: Subject to any disclaimer, the term of this patent is extended or adjusted under 35 U.S.C. 154(b) by 944 days.

(21) Appl. No.: 15/774,113

(22) PCT Filed: Dec. 18, 2015

(86) PCT No.: PCT/EP2015/002557
§ 371 (c)(1),
(2) Date: May 7, 2018

(87) PCT Pub. No.: WO2017/080569
PCT Pub. Date: May 18, 2017

(65) Prior Publication Data
US 2018/0320377 A1    Nov. 8, 2018

(30) Foreign Application Priority Data
Nov. 11, 2015 (DE) .......................... 102015014513.4

(51) Int. Cl.
| | |
|---|---|
| *B32B 9/00* | (2006.01) |
| *E04C 2/04* | (2006.01) |
| *C01B 32/198* | (2017.01) |
| *B82Y 30/00* | (2011.01) |

(52) U.S. Cl.
CPC ............ *E04C 2/043* (2013.01); *C01B 32/198* (2017.08); *B82Y 30/00* (2013.01); *Y10T 428/30* (2015.01)

(58) Field of Classification Search
CPC ......... Y10T 428/30; B32B 9/007; H01B 1/04; B82Y 30/00

USPC .......................................... 428/408; 423/448
See application file for complete search history.

(56) References Cited

U.S. PATENT DOCUMENTS

| | | | | |
|---|---|---|---|---|
| 5,979,131 A | * | 11/1999 | Remmele et al. ...... | E04C 2/288 |
| | | | | 52/309.9 |
| 8,580,132 B2 | | 11/2013 | Lin | |
| 2001/0001218 A1 | * | 5/2001 | Luongo .................. | B29C 39/14 |
| | | | | 428/305.5 |
| 2011/0212320 A1 | * | 9/2011 | Greenhill ................ | B32B 27/36 |
| | | | | 428/313.3 |
| 2012/0315482 A1 | * | 12/2012 | Muramatsu ....... | C04B 35/62281 |
| | | | | 428/402 |
| 2013/0273273 A1 | * | 10/2013 | Greenhill ................. | C09D 1/00 |
| | | | | 428/34.1 |
| 2014/0329045 A1 | | 11/2014 | Jones | |
| 2014/0370248 A1 | * | 12/2014 | Hurt ....................... | B09B 1/004 |
| | | | | 428/189 |

FOREIGN PATENT DOCUMENTS

| | | | | |
|---|---|---|---|---|
| CN | 103359997 A | | 10/2013 | |
| CN | 103362273 A | | 10/2013 | |
| CN | 103922687 A | | 7/2014 | |
| KR | 101440992 B1 | * | 11/2014 | ............ B32B 21/06 |
| WO | 2011/093765 A1 | | 8/2011 | |
| WO | 2011095634 A1 | | 8/2011 | |
| WO | WO2013/109891 A1 | * | 7/2013 | ............ B09B 1/004 |
| WO | 2014037882 A1 | | 3/2014 | |

OTHER PUBLICATIONS

Translation of Park, KR 101440992 B1, Nov. 2014, translation obtained Jun. 2022.*

* cited by examiner

*Primary Examiner* — Daniel H Miller
(74) *Attorney, Agent, or Firm* — Mark Terry

(57) ABSTRACT

The invention relates to building products, in particular building boards, which comprise graphene and/or graphene oxide.

6 Claims, No Drawings

BUILDING PRODUCTS WITH GRAPHENE OR GRAPHENE OXIDE

The invention relates to building products, in particular building boards. In particular, the invention relates to building products and building boards which comprise a material with a hexagonal honeycomb structure, preferably in a monomolecular layer thickness.

Building products such as building boards, partition wall boards, floor screeds, plasters or fillers are known from the prior art. All these products have to have a certain strength with respect to mechanical and/or thermal loading. There are various possible ways of producing these properties in a specific product. The simplest way is for the base materials for the production of this product to be selected corresponding to the desired property. If, however, combinations of a plurality of properties are desired in a product, the appropriate choice of a base material is often not sufficient. Functional materials in the broadest sense are used in these cases.

Materials comprising two dimensional networks with a monomolecular layer thickness such as graphene or silicene are relatively new materials on the market of material sciences. They have outstanding mechanical, chemical and electrical properties, which are intended to be used within the scope of this invention.

Graphene is a material which forms the basic structure of graphite. Graphite comprises layers of graphene stacked upon one another in an ordered or random manner, said layers being held together in layer packs by means of relatively weak van der Waals forces. The mechanical properties of graphite are dominated by the layer pack bonding by means of van der Waals forces. The layers held together by the van der Waals forces can be split up relatively easily into smaller layer packs by shearing. This property enables, for example, the use of graphite in pencil leads for writing.

In contrast with this, no van der Waals bonds are present in graphene, because it consists of monomolecular layers and not layer packs, as is the case with graphite. In an ideally constituted graphene, there is a hexagonal basic structure, wherein six C atoms are each bonded together by non-localised covalent double bonds to form honeycomb structures. The bonding energy between two of these C atoms is among the most powerful known in nature and stands at approx. 5.9 eV. This explains the very much greater mechanical stability of this material compared to graphite: It has been demonstrated that graphene has a greater tear resistance than steel.

Graphene oxide has good mechanical properties similar to those of graphene. The basic structure is similar to graphene, i.e. it involves monomolecular layers of hexagonal-honeycomb structures, which however have a more pronounced corrugation compared to graphene. Graphene oxide is water-soluble and forms a colloidal dispersion with water, which is very well suited for the production of paper-like films and for use as a coating agent.

The terms "graphene" and "graphene oxide" are also understood to mean modifications/derivatives of functionalized compounds which are directly derived from these materials.

Within the scope of this invention, the terms graphene and graphene oxide denote not only the pure substances, but also mixtures, in particular mixtures of graphene and/or graphene oxide with graphite. Graphene-containing or graphene oxide-containing mixtures are ones which contain more than 1 vol.-% graphene or graphene oxide, particularly preferably more than 3 vol.-% and especially preferably more than 10 vol.-% graphene or graphene oxide in the dry matter, verified by atomic force microscopy in combination with Raman spectroscopy. This restriction of the lower limit serves essentially to differentiate between graphene-containing dispersion products and exclusively graphite-containing dispersions.

Following literature, graphene here is denoted as graphene in its form with a monomolecular layer thickness, but also in layer stacks of less than 10 graphene layers upon one another (see Eigler, S. and Hirsch, A. (2014): Chemie an Graphen and Graphenoxid—eine Herausforderung für Synthesechemiker, Angew. Chem. 2014, Vol. 126, S. 2-23). Layer stacks of graphene with 11 and more graphene layers are understood to mean graphite.

The fundamental idea of the invention is based on the use of graphene and graphene oxide in building materials in general and building boards in particular. Building materials include in particular building boards, partition wall boards, floor screeds, plasters and fillers.

Particularly preferably, building materials are on a calcium sulphate-containing base, i.e. anhydrite-based, calcium sulphate-hemihydrate-based and gypsum-based building materials. Materials that have a calcium sulphate-containing base have a proportion of calcium sulphate of at least 10 wt.-%, preferably at least 50 wt-% and particularly preferably at least 80 wt.-% related to the dry binding material content of the mixture.

Alternatively, the invention can also be applied to cement-containing building products in general, wherein the calcium sulphate content of these products can lie below the aforementioned 10 wt.-% of the dry matter of the binding agent, or the product can even be essentially free from calcium sulphate. In this case, the binding agent can for example be a hydraulic cement, another inorganic binding agent such as for example water glass or an organic binding agent such as for example a natural or a synthetic resin.

Moreover, irrespective of their base material, building boards are covered by the invention if they contain a material with a hexagonal honeycomb structure and a monomolecular layer thickness. Building boards for drywall construction can comprise the most diverse materials, e.g. wood, gypsum, cement, microspheres (e.g. perlite, cenospheres of fly ash, ceramic microspheres) etc. as a base material. In particular, the tensile strength of graphene and graphene oxide can be used advantageously to improve the mechanical properties of the building boards, such as the sag resistance, breaking load and bending tensile strength.

Moreover, especially graphene with its two-dimensional hexagonal honeycomb structure and the monomolecular layer thickness has considerable potential for improving the fire resistance of building materials, in particular of building boards or plasters. The thermal conductivity of graphene is highly anisotropic: It is very high in the propagation direction of the two-dimensional lattice, but very low in directions perpendicular to the lattice propagation direction. This means that high temperatures on one side of a graphene layer are not conducted to its other side.

The invention thus relates to building products comprising graphene and/or graphene oxide. Furthermore, the invention relates to building boards comprising graphene and/or graphene oxide.

According to a particularly preferred embodiment of the invention, the building board comprises graphene and/or graphene oxide in the form of a layer. This layer can be present on at least one, preferably both surfaces of the building board. In this arrangement, it can for example serve as an external reinforcement against mechanical loads or also as a fire protection material (raising of the fire protection class).

In a further embodiment, the building board can be constituted by a plurality of (i.e. at least two) material layers. These material layers can be the same or different. In the case of lightweight plasterboards, production from different layers for weight reduction with unchanged mechanical loading capacity, for example, is becoming increasingly prevalent. For this purpose, relatively stable and dense boundary layers are constituted, which surround a highly porous core layer in a sandwich-like manner. In order to reinforce and further develop this "lightweight construction", the reinforcement of the external side of the building boards is particularly suitable.

In a preferred development of the invention, however, it is also or additionally possible to dispose a layer of graphene and/or graphene oxide between two layers of the building board. This reinforcement strengthens the building board from the interior.

The graphene layer and/or graphene oxide layer can be applied over the full area or a partial area on the surface of the building board or between the material layers of the building board.

A further possibility consists in the use of individual strips of graphene or graphene oxide. The strips can be advantageously applied in the longitudinal and/or transverse direction of the building board, i.e. the two-dimensional board extension, so that they run for example in the direction of the maximum mechanical loading of the board. The strips can thus also be introduced in a lattice form onto and/or into the building board, wherein the desired strengthening of the mechanical loading capacity of the building board can be adjusted by means of the lattice spacings and/or the variability of the thickness and/or the area dimensions of the lattice.

Particularly preferably, graphene and/or graphene oxide is used in a paper-like form. Graphene oxide paper can be produced for example by colloidal solution of graphene oxide and subsequent deposition over the area and drying of the graphene oxide flakes. Graphene paper can now also be produced by arranging a plurality of graphene layers upon one another, immersing them in a bath of surfactant and then drying them. The films thus produced can be processed like paper, i.e. cut, folded and so forth.

According to a further embodiment of the invention, the graphene and/or graphene-oxide layer is present on a surface of the building board and is encased over the full or a partial area by a casing material, for example paperboard or (non-woven) fabric.

In a further variant of this embodiment, the graphene or graphene-oxide layer is applied not on the surface of the building board, but on the casing material. The casing material can be joined, for example by adhesion, with the layer; the casing material can however also be coated or saturated by means of a dispersion for example. The coating can take place before the application of the casing on the building board, or the encased building board can be subsequently provided with the coating or saturation.

The use of graphene- or graphene-oxide layers, over the full or a partial area, for example in the form of strips, advantageously assists the sag resistance, the flexural strength and the bending tensile strength of the building boards. The same also applies of course to other building products.

A further possibility of using graphene and/or graphene oxide advantageously in building boards consists in using the graphene and/or graphene-oxide layer as reinforcement in the building material itself. Various variants are suggested for implementing this embodiment: On the one hand, the reinforcement can be present in an orientated manner in the board in the form of strips in the direction of the greatest loading (in particular tensile loading). The lattice arrangement of graphene and/or graphene oxide strips described above is however also possible. A layer disposed in the building board that covers a partial or the full area is of course also possible.

The invention claimed is:

1. A gypsum containing building board comprising a plurality of material layers, wherein at least one of the plurality of material layers is a graphene or graphene oxide layer composed of graphene paper or graphene oxide paper, wherein an exterior surface of the building board comprises a casing material, below which is located the graphene or graphene oxide layer, and wherein at least one of the plurality of material layers comprises a calcium sulfate material with at least 10 wt.-% of calcium sulphate, wherein the layer composed of graphene paper or graphene oxide paper comprises individual strips, wherein the strips extend in the longitudinal and/or transverse direction of the building board.

2. Gypsum-containing building boards according to claim 1, wherein the layer composed of graphene paper or graphene oxide paper is applied over a full area or a partial area of the building board.

3. Gypsum-containing building boards according to claim 1, wherein the layer composed of graphene paper or graphene oxide paper comprises individual strips.

4. Gypsum-containing building boards according to claim 3, wherein the strips extend in the longitudinal and/or transverse direction of the building board.

5. Gypsum-containing building boards according to claim 1, wherein the at least one layer composed of graphene paper or graphene oxide paper is overlapped over a full area or a partial area by a casing material.

6. Gypsum-containing building boards according to any one of claims 1 and 2 wherein the at least one layer composed of graphene paper or graphene oxide paper is contained as a reinforcement in the building board material.

\* \* \* \* \*